(12) United States Patent
Kang

(10) Patent No.: US 8,729,759 B2
(45) Date of Patent: May 20, 2014

(54) SPINDLE MOTOR

(75) Inventor: Sang Sun Kang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 562 days.

(21) Appl. No.: 12/654,676

(22) Filed: Dec. 29, 2009

(65) Prior Publication Data

US 2011/0069416 A1 Mar. 24, 2011

(30) Foreign Application Priority Data

Sep. 22, 2009 (KR) ........................ 10-2009-0089705

(51) Int. Cl.
*H02K 5/24* (2006.01)
*H02K 7/04* (2006.01)
*H02K 21/22* (2006.01)
*G11B 19/20* (2006.01)

(52) U.S. Cl.
CPC .. *H02K 5/24* (2013.01); *H02K 7/04* (2013.01); *H02K 21/22* (2013.01); *G11B 19/2009* (2013.01)
USPC .. 310/156.04; 310/90; 310/90.5; 310/156.01; 310/156.75; 310/51; 360/274

(58) Field of Classification Search
CPC ........... H02K 5/24; H02K 7/04; H02K 21/22; G11B 5/52; G11B 19/2009
USPC .................. 310/90, 90.5, 156.01, 156.04, 51, 310/156.74; 360/274
IPC ..................................... H02K 5/24, 7/04, 21/22
See application file for complete search history.

(56) References Cited

U.S. PATENT DOCUMENTS

| | | | | |
|---|---|---|---|---|
| 7,201,517 B2* | 4/2007 | Gomyo et al. | ................ | 384/107 |
| 7,830,049 B2* | 11/2010 | Yoneda et al. | ................ | 310/51 |
| 8,508,884 B2* | 8/2013 | Sekii et al. | ................ | 360/99.08 |
| 2003/0168923 A1* | 9/2003 | Gomyo et al. | ........... | 310/156.01 |
| 2005/0058374 A1* | 3/2005 | Gomyo et al. | ................ | 384/119 |
| 2006/0244326 A1* | 11/2006 | Tamaoka | ........................ | 310/90 |
| 2007/0001531 A1* | 1/2007 | Nagai | ........................ | 310/156.04 |
| 2009/0174272 A1* | 7/2009 | Yoneda et al. | ........... | 310/156.04 |
| 2010/0142359 A1* | 6/2010 | Sakata et al. | ................ | 369/270.1 |
| 2011/0069416 A1* | 3/2011 | Kang | ........................ | 360/274 |

FOREIGN PATENT DOCUMENTS

JP 2009-5561 1/2009
KR 2001-0063004 7/2001

OTHER PUBLICATIONS

Korean Office Action issued Mar. 8, 2011 in corresponding Korean Patent Application 10-2009-0089705.

* cited by examiner

*Primary Examiner* — John K Kim

(57) ABSTRACT

A spindle motor according to an aspect of the invention may include: a base on which a sleeve is mounted; a rotor bound together with a shaft rotatably mounted on the sleeve and rotating by electromagnetic interaction with the stator; a pulling plate mounted on the base to generate a magnetic force in a rotary axis direction of the rotor; and an escape portion provided on the base at a position corresponding to the pulling plate and providing a space into which an adhesive may escape when bonding the pulling plate.

7 Claims, 3 Drawing Sheets

SPINDLE MOTOR

CROSS-REFERENCE TO RELATED APPLICATIONS

This application claims the priority of Korean Patent Application No. 10-2009-0089705 filed on Sep. 22, 2009, in the Korean Intellectual Property Office, the disclosure of which is incorporated herein by reference.

BACKGROUND OF THE INVENTION

1. Field of the Invention

The present invention relates to spindle motors, and more particularly, to a spindle motor that improves the rotational characteristics of a rotor when a stator and a rotor are coupled with each other.

2. Description of the Related Art

In general, a spindle motor, installed inside a hard disk drive, rotates a disk so that a magnetic head can read data recorded on the disk.

Small, lightweight, and thin hard disk drives are now required. In particular, there is an increasing need for ultra-thin, slim spindle motors having a spindle structure, used in laptop computers, which can maintain the performance of a motor and at the same time, increase price competitiveness.

This spindle motor may include a shaft that serves as the rotary center rotating by hydrodynamic bearings and a metal sleeve assembled with the shaft to form a sliding surface.

The spindle motor in the related art is configured so that a magnetic field is generated in the axial direction of the bearings. To this end, a pulling plate may be arranged under a magnet at a position corresponding to the magnet.

However, as for the spindle motor in the related art, the pulling plate may be inappropriately bonded to a base if an adhesive is unevenly applied in a process of bonding the pulling plate to the base. Therefore, there is a need for techniques to solve these problems.

SUMMARY OF THE INVENTION

An aspect of the present invention provides a spindle motor having an optimal structure allowing for the bonding of a pulling plate regardless of a location at which an adhesive is applied.

According to an aspect of the present invention, there is provided a spindle motor including: a base on which a sleeve is mounted; a rotor bound together with a shaft rotatably mounted on the sleeve and rotating by electromagnetic interaction with the stator; a pulling plate mounted on the base to generate a magnetic force in a rotary axis direction of the rotor; and an escape portion provided on the base at a position corresponding to the pulling plate and providing a space into which an adhesive may escape when bonding the pulling plate.

The escape portion may be provided at one side of the base where the pulling plate is mounted.

The escape portion may be provided at both sides of the base where the pulling plate is mounted.

The escape portion may be tapered into the base.

A receiving recess may be recessed into the pulling plate, and the adhesive may be received within the receiving recess when the pulling plate is bonded to the base.

The pulling plate may include a horizontal portion arranged horizontally in relation to the rotor and a vertical portion extending from the horizontal portion at right angles.

The base may include a horizontal surface making close contact with the horizontal portion of the pulling plate and a vertical surface provided at right angles to the horizontal surface so that the vertical surface makes close contact with the vertical portion of the pulling state.

The base may include an inclined surface connecting the horizontal surface and the vertical surface to each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

A spindle motor according to an exemplary embodiment of the present invention will be described in detail with reference to FIGS. 1 through 6. Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
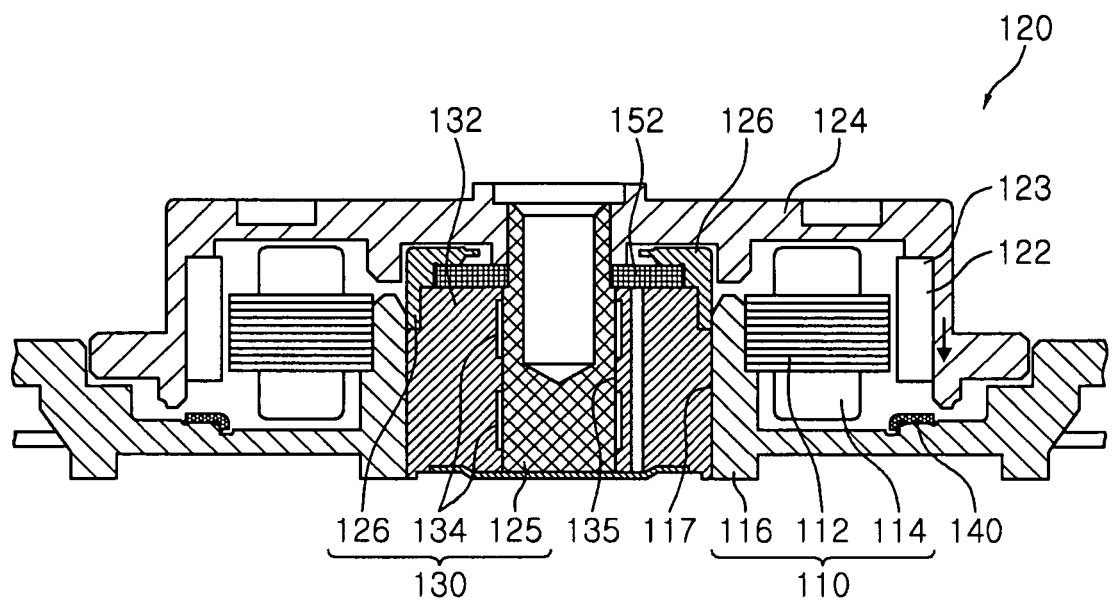
FIG. 1 is a schematic sectional view illustrating a spindle motor according to an exemplary embodiment of the present invention.
Figure 2:
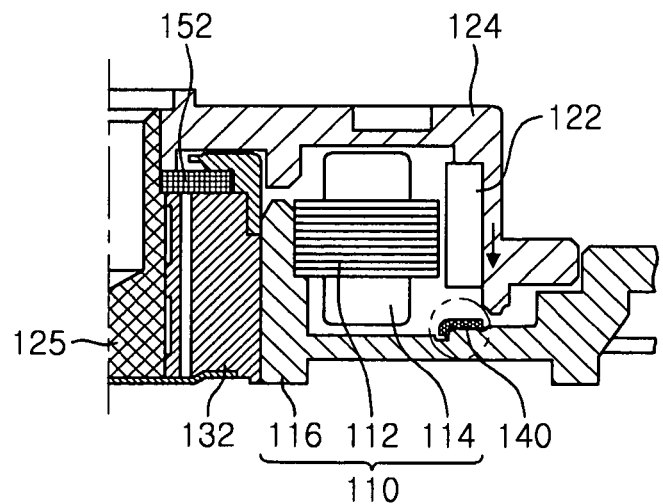
FIG. 2 is a partial sectional view illustrating the spindle motor of FIG. 1.

FIG. 1 is a schematic sectional view illustrating a spindle motor according to an exemplary embodiment of the invention. FIG. 2 is a partial sectional view illustrating the spindle motor of FIG. 1.

Referring to FIGS. 1 and 2, a spindle motor according to this embodiment includes a stator 110, a rotor 120, hydrodynamic bearings 130, a pulling plate 140 and an escape portion 150.

The stator 110 is a stationary part having winding coils 114 generating an electromagnetic force having a predetermined magnitude when power is applied, and a plurality of cores 112 around which the winding coils 114 are wound in a radial manner on the basis of at least one pole.

A plurality of coil holes having a predetermined size may be formed in an upper surface of the base 116 that corresponds to the winding coils 114 in order to expose the winding coils 114 on the bottom. The winding coils 114 are electrically connected to a flexible substrate to supply external power.

Furthermore, the rotor 120 is a rotating part rotatable relative to the stator 110. A hub 124 that is cup-shaped corresponds to the cores 112 at a predetermined interval therebetween, and has a magnet 122, shaped like a ring along an outer circumferential surface thereof. The magnet 122 may be a permanent magnet having magnetic north and south poles magnetized alternately in the circumferential direction to generate a magnetic force having a predetermined magnitude.

The hydrodynamic bearings 130 may include a shaft 125 that coincides with a rotary center of the rotor 120, a sleeve 132 having a shaft groove 135 in which the shaft 125 is arranged, and a plurality of radial dynamic pressure generating grooves 134 formed in one side of the outside diameter of the sleeve or the inside diameter of the sleeve.

The hub 124 rotating with the magnet 122 when a motor is driven is formed integrally with a skirt portion 123 and a shaft 125. The magnet 122 is mounted on the skirt portion 123. The shaft 125 extends downward at a predetermined distance from a lower surface of the hub 124 and is arranged along the vertical axis that coincides with a rotary center of the hub 124. The shaft 125 is inserted into a shaft hole 135 of the sleeve 132 to be described below.

A stopper ring 126 that makes contact with an upper part of the sleeve 132 is mounted between the hub 124 and the sleeve 132, which is a stationary member mounted on the stator 110. A locking force between the stopper ring 126 and the sleeve 132 prevents the separation of the stopper ring 126.

The sleeve 132 is a rotation support member that corresponds to the rotor 120 at a predetermined interval to form a sliding surface therebetween. Here, a fluid may fill the space between the sleeve 132 and the shaft 125 to thereby reduce friction against the sleeve 132 when the shaft 125 rotates.

The pulling plate 140 may be mounted on the base 116 so that the pulling plate 40 is located under the magnet 122. As shown in FIG. 2, a force is applied downward through the interaction between the pulling plate 140 and the magnet 122.

Therefore, the force generated by the pulling plate 140 and the magnet 122 is applied downward in the axial direction of the rotary shaft, thereby producing the same effect as if the hub 124 was pressed down from top.

In the spindle motor according to this embodiment, when the rotor 120 rotates, a force pressing the hub 124 down is applied to cancel a force causing the hub 124 to be released to the outside, thereby executing stable rotary driving.

Figure 3:
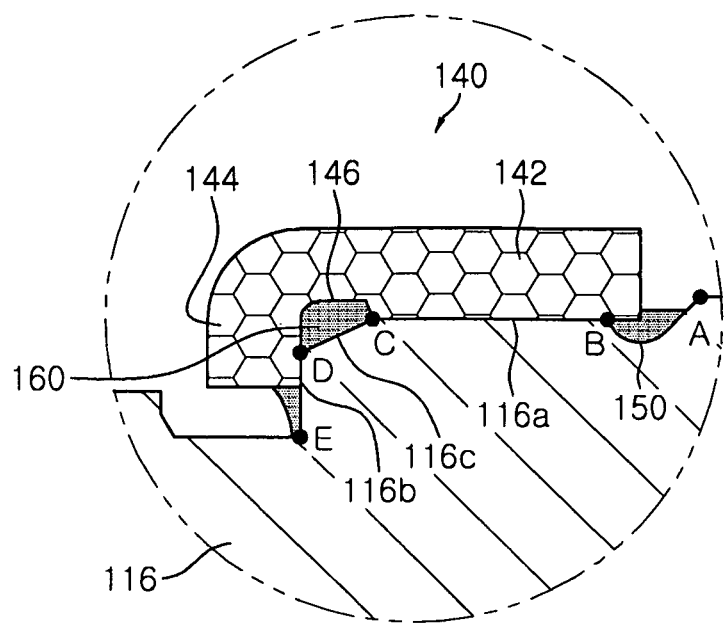
FIG. 3 is a partial enlarged view illustrating an escape portion of a spindle motor according to an exemplary embodiment of the present invention.
Figure 4:
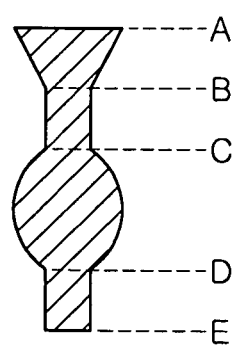
FIG. 4 is a schematic graph illustrating the amount of an adhesive applied to a base of the spindle motor of FIG. 3.

FIG. 3 is a partial exploded view illustrating an escape portion of a spindle motor according to an exemplary embodiment of the invention. FIG. 4 is a graph schematically illustrating the amount of an adhesive applied to a base of the spindle motor of FIG. 3.

Referring to FIG. 3, the escape portion 150 is formed on the base 116 at a position corresponding to the pulling plate 140. Specifically, the escape portion 150 is located on the base 116 corresponding to the end of the pulling plate 140.

The escape portion 150 is recessed into the base 116. Here, the recess may be inclined at an angle of 5 degrees or more with respect to the surface.

The pulling plate 140 is L-shaped. Specifically, the pulling plate 140 may include a horizontal portion 142 arranged horizontally in relation to the rotor 120 and a vertical portion 144 extending from the horizontal portion 142 at right angles.

Furthermore, a receiving recess 146 is recessed into the pulling plate 140. When the pulling plate 140 and the base 116 are bonded to each other, an adhesive 160 is received in the receiving recess 146.

Therefore, as the adhesive fills the receiving recess 146, an adhesive surface of the pulling plate 140 is increased, so that the receiving recess 146 increases adhesiveness.

Here, the base 116 includes a horizontal surface 116a making close contact with the horizontal portion 142 of the pulling plate 140 and a vertical surface 116b formed to be vertical to the horizontal surface 116a so that the vertical portion 144 makes close contact with the vertical surface 116b. Therefore, the base 116 is formed so that the L-shaped pulling plate 140 is mounted on the base 116.

The base 116 further includes an inclined surface 116c that connects the horizontal surface 116a and the vertical surface 116b. Therefore, an area of the adhesive surface can be increased, and a larger amount of the adhesive may fill the space between the receiving recess 146 and the inclined surface 116c. Therefore, the bonding strength between the pulling plate 140 and the base 116 can increase.

In the graph, illustrated in FIG. 4, the area of a figure refers to the amount of an adhesive applicable at points A through E.

Here, in an interval A to B, where the escape portion 150 is formed, the amount of an adhesive to be applied increases towards the end.

Here, if the escape portion 150 is not formed on the base 116 on which the pulling plate 140 is mounted, when the adhesive 160 is applied at an inappropriate position, the adhesive may not flow over the entire adhesive surface of the base 116 making contact with the pulling plate 140.

Therefore, the bonding strength between the pulling plate 140 and the base 116 may be reduced depending on the bonding position.

However, the spindle motor according to this embodiment includes the escape portion 150 that provides a space into which the adhesive 160 can escape when bonding the pulling plate 140 to the base 116. Even when the adhesive 160 is applied at an inappropriate position, the adhesive 160 can evenly flow, thereby increasing the bonding strength of the pulling plate 140.

Figure 5:
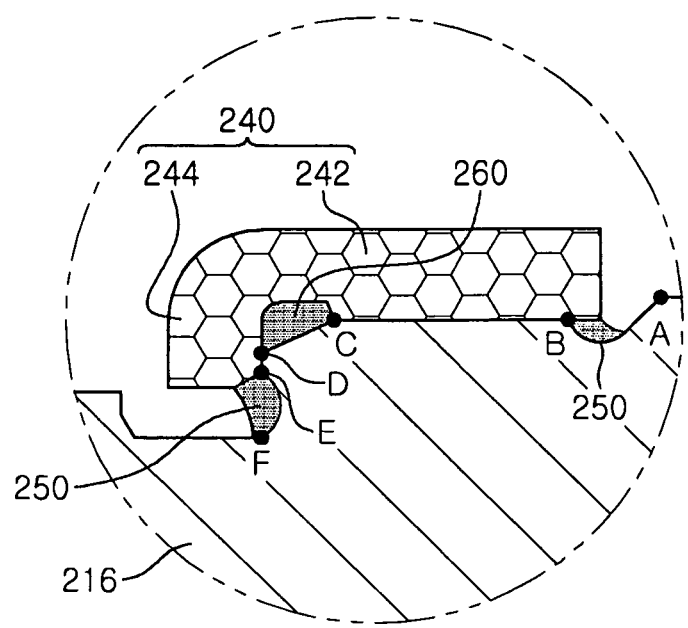
FIG. 5 is a partial enlarged view illustrating escape portions of a spindle motor according to another exemplary embodiment of the present invention.
Figure 6:
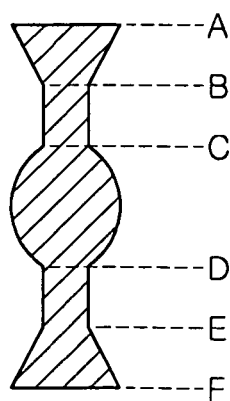
FIG. 6 is a schematic graph illustrating the amount of an adhesive applied to the base of the spindle motor of FIG. 5.

FIG. 5 is a partial enlarged view illustrating escape portions of a spindle motor according to another exemplary embodiment of the invention. FIG. 6 is a graph schematically illustrating the amount of an adhesive being applied to a base of the spindle motor.

Referring to FIGS. 5 and 6, escape portions 250 are formed on a base 216 at positions corresponding to a pulling plate 240. Specifically, the escape portions 250 are located on both ends of the base 216 corresponding to the pulling plate 240.

At this time, the escape portions 250 are formed on the end of a horizontal portion 242 and the end of a vertical portion 244 of the pulling plate 240. The escape portions 250 are recessed at an angle of 5 degrees or more with respect to the surface.

In the graph, illustrated in FIG. 6, the area of a figure refers to the amount of an adhesive applicable at points A through E of FIG. 5.

Here, in an interval A to E, where the escape portion 250, arranged on the end of the horizontal portion 242, is formed, the amount of an adhesive to be applied increases towards the end. Furthermore, in an interval E to F, where the escape portion 250, arranged on the end of the vertical portion 244, is formed, the amount of an adhesive to be applied increases towards the end.

Therefore, in the spindle motor according to this embodiment, since the escape portions 250 are formed on both ends of the pulling plate 240, even when the adhesive 260 is applied at an appropriate position due to surface tension, the adhesive 260 can evenly flow, thereby increasing the bonding strength of the pulling plate 240.

As set forth above, according to exemplary embodiments of the invention, as the spindle motor includes an escape portion providing a space into which an adhesive may escape when bonding the pulling plate, even when the adhesive is applied at an appropriate position, the adhesive flows evenly, thereby increasing the bonding strength of the pulling plate.

While the present invention has been shown and described in connection with the exemplary embodiments, it will be apparent to those skilled in the art that modifications and variations can be made without departing from the spirit and scope of the invention as defined by the appended claims.

What is claimed is:

1. A spindle motor comprising:
a base on which a sleeve is mounted;
a rotor bound together with a shaft rotatably mounted on the sleeve and rotating by electromagnetic interaction with a stator;
a pulling plate mounted on the base to generate a magnetic force in a rotary axis direction of the rotor; and
an escape portion provided on the base at a position corresponding to the pulling plate and providing a space into which an adhesive escapes when bonding the pulling plate,
wherein a receiving recess is recessed into the pulling plate, and the adhesive is received within the receiving recess when the pulling plate is bonded to the base.

2. The spindle motor of claim 1, wherein the escape portion is provided at one side of the base where the pulling plate is mounted.

3. The spindle motor of claim 1, wherein the escape portion is provided at both sides of the base where the pulling plate is mounted.

4. The spindle motor of claim 1, wherein the escape portion is tapered into the base.

5. The spindle motor of claim 1, wherein the pulling plate comprises a horizontal portion arranged horizontally in relation to the rotor and a vertical portion extending from the horizontal portion at right angles.

6. The spindle motor of claim 5, wherein the base comprises a horizontal surface making close contact with the horizontal portion of the pulling plate and a vertical surface provided at right angles to the horizontal surface so that the vertical surface makes close contact with the vertical portion of the pulling state.

7. The spindle motor of claim 5, wherein the base comprises an inclined surface connecting the horizontal surface and the vertical surface to each other.

\* \* \* \* \*